US008625451B2

(12) United States Patent
Leventu

(10) Patent No.: US 8,625,451 B2
(45) Date of Patent: Jan. 7, 2014

(54) METHODS, SYSTEMS, AND COMPUTER READABLE MEDIA FOR NON INTRUSIVE MEAN OPINION SCORE (MOS) ESTIMATION BASED ON PACKET LOSS PATTERN

(75) Inventor: Lucian Leventu, Bucharest (RO)

(73) Assignee: Ixia, Calabasas, CA (US)

( * ) Notice: Subject to any disclaimer, the term of this patent is extended or adjusted under 35 U.S.C. 154(b) by 161 days.

(21) Appl. No.: 13/111,898

(22) Filed: May 19, 2011

(65) Prior Publication Data

US 2012/0294164 A1 Nov. 22, 2012

(51) Int. Cl.
*H04J 1/16* (2006.01)

(52) U.S. Cl.
USPC .......................................... 370/252; 370/352

(58) Field of Classification Search
USPC ......... 370/252, 235, 352, 233, 234, 356–358, 370/242, 244, 245, 250, 253; 704/223, 224, 704/225, 226; 709/223, 224, 225, 226
See application file for complete search history.

(56) References Cited

U.S. PATENT DOCUMENTS

2012/0039203 A1* 2/2012 Hardy ........................... 370/252

OTHER PUBLICATIONS

"Series P: Telephone Transmission Quality, Telephone Installations, Local Line Networks, Methods for Objective and Subjective Assessment of Quality; Amendment 2: Revised Annex A—Reference Implementations and Conformance Testing for ITU-T Recs p. 862, p. 862.1, and p. 862.2," ITU—T p. 862 Amendment 2 (Nov. 2005).

"Series G: Transmission Systems and Media, Digital Systems and Networks; International Telephone Connvections and Circuits—General Definitions; The E-model, a Computational Model for Use in Transmission Planning," ITU-T G.107 (Mar. 2005).

"Series P: Telephone Transmission Quality, Telephone Installations, Local Line Networks; Methods for Objective and Subjective Assessment of Quality; Mapping Function for Transforming p. 862 Raw Result Scores to MOS-LQO," ITU-T p. 862.1 (Nov. 2003).

(Continued)

*Primary Examiner* — Dady Chery
(74) *Attorney, Agent, or Firm* — Jenkins, Wilson, Taylor & Hunt, P.A.

(57) ABSTRACT

Methods, systems, and computer readable media for non-intrusive mean opinion score (MOS) estimation based on packet loss pattern are disclosed. According to one aspect, a method for non-intrusive mean opinion score estimation based on packet loss pattern includes receiving a packet data stream, measuring the packet loss for the received data stream, calculating a probability of packet loss based on the measured packet loss, and calculating an estimated mean opinion score based on the calculated probability of packet loss. In one embodiment, the estimated mean opinion score is calculated using a mathematical function that maps calculated probability of packet loss to mean opinion score. In one embodiment, the mathematical function is a polynomial having coefficients that are selected so that the polynomial closely models reference opinion scores for a range of packet loss probabilities. In one embodiment, the coefficients are determined using a least squares analysis of a dataset that includes reference opinion scores for each of a range of packet loss probabilities. In one embodiment, the reference opinion scores for each of a range of packet loss probabilities are calculated using an intrusive algorithm to analyze lossy data streams that exhibit particular packet loss probabilities and generate mean opinion scores for each of the respective packet loss probabilities.

21 Claims, 4 Drawing Sheets

(56) References Cited

OTHER PUBLICATIONS

"Series P: Telephone Transmission Quality, Telephone Installations, Local Line Networks; Methods for Objective and Subjective Assessment of Quality; Perceptual Evaluation of Speech Quality (PESQ): An Objective Method for End-to-End Speech Quality Assessment of Narrow-band Telephone Networks and Speech Codecs," ITU-T p. 862 (Feb. 2001).

"Transmission Systems and Media; General Characteristics of International Telephone Connections and International Telephone Circuits; Transmission Impairments," ITU-T G.113 (Feb. 1996).

* cited by examiner

METHODS, SYSTEMS, AND COMPUTER READABLE MEDIA FOR NON INTRUSIVE MEAN OPINION SCORE (MOS) ESTIMATION BASED ON PACKET LOSS PATTERN

TECHNICAL FIELD

The subject matter described herein relates to methods and systems for quality of voice evaluation in packet loss environments. More particularly, the subject matter described herein relates to methods, systems, and computer readable media for non-intrusive mean opinion score (MOS) estimation based on packet loss pattern.

BACKGROUND

Mean opinion score (MOS) is a numerical indication of the perceived quality of received media after compression and/or transmission. The MOS is expressed as a single number in the range 1 to 5, where 1 is lowest perceived audio quality, and 5 is the highest perceived audio quality measurement. Historically, mean opinion scores were generated by averaging the results of a set of standard, subjective tests in which a number of listeners listed to test sentences read aloud by both male and female speakers over the communications medium being tested. This listeners rated the audio quality of the test sentence according to a score ranging from 1 (bad quality or very annoying impairment) to 5 (excellent quality or imperceptible impairment.) A score for the communications medium was calculated as the arithmetic mean of all the individual opinion scores—thus the name "mean opinion score". Eventually, algorithms were developed that calculated a mean opinion score without the need for human listeners. These algorithms were based on a mathematical analysis of observed or modeled degradation of audio waveforms or test tones, such as samples of human speech.

For example, ITU-T Recommendation G.107, hereinafter referred to as "ITU-T G.107", defines what is known as the E-model, which is a computational model for use in transmission planning. This model includes an algorithm to calculate a transmission rating factor, R, which is a numerical value between 0 (extremely low quality) and 100 (extremely high quality.) The algorithm considers factors such as signal to noise ratio, absolute delay, simultaneous and delayed impairments, packet-loss probability, and quantizing distortion. Annex B of ITU-T G.107 also defines a function to map R values between 0 and 100 into MOS values between 1 and 4.5. (The highest R value, 100, is less than the highest MOS value, 5.)

However, the E-model defined in ITU-T G.107 is, as the name suggests, an algorithm for modeling how satisfied or unsatisfied a user will be with a particular communication system, including particular codecs, etc., once that system is built. The E-model gives an estimation of voice transmission quality, which can be transformed to give estimates of customer opinion, but in several places, including Annex C of ITU-T G.107, it is made clear that such estimates are only made for transmission planning purposes and is not suitable for actual (e.g., not modeled) customer opinion prediction.

ITU-T Recommendation P.862, hereinafter referred to as "ITU-T P.862", defines a method that is suitable for end-to-end speech quality assessment. This method is called the perceptual evaluation of speech quality, or PESQ. PESQ compares an original signal to a degraded version of the same signal and calculates a numerical score between –0.5 and 4.5, which roughly corresponds to a MOS score of between 1.0 and 4.5. PESQ attempts to compensate for delays, frequency distortion, and gain loss introduced into the degraded signal before comparing it to the original signal. The final PESQ score is a linear combination of the average disturbance value and the average asymmetrical disturbance value.

However, PESQ performs its comparison on a decoded data stream; as data packets are received their contents must be extracted and used as input into the PESQ algorithm. An algorithm that operates on the contents of data packets is herein referred to as an "intrusive" algorithm, because the algorithm must intrude into the contents of the packets. Because the packet contents must be extracted and reassembled in order, intrusive algorithms are computationally more expensive than "non-intrusive" algorithms, which do not need to have access to the packet contents. ITU-T P.862 acknowledges the intrusive nature of the PESQ algorithm, and Table 2 of ITU-T P.862 specifically lists "In-service non-intrusive measurement devices" as an application for which PESQ is known to be inaccurate, e.g., that PESQ is not intended for use for non-intrusive measurement devices.

In light of the disadvantages described above, there exists a need for non-intrusive calculation of customer opinion prediction based on actual network performance. Accordingly, there exists a need for methods, systems, and computer readable media for non-intrusive mean opinion score (MOS) estimation based on packet loss pattern.

SUMMARY

According to one aspect, a method for non-intrusive mean opinion score estimation based on packet loss pattern includes receiving a packet data stream, measuring the packet loss for the received data stream, calculating a probability of packet loss based on the measured packet loss, and calculating an estimated mean opinion score based on the calculated probability of packet loss. In one embodiment, the estimated mean opinion score is calculated using a mathematical function that maps calculated probability of packet loss to mean opinion score. In one embodiment, the mathematical function is a polynomial having coefficients that are selected so that the polynomial closely models reference opinion scores for a range of packet loss probabilities. In one embodiment, the coefficients are determined using a least squares analysis of a dataset that includes reference opinion scores for each of a range of packet loss probabilities. In one embodiment, the reference opinion scores for each of a range of packet loss probabilities are calculated using an intrusive algorithm to analyze lossy data streams that exhibit particular packet loss probabilities and generate mean opinion scores for each of the respective packet loss probabilities.

According to another aspect, the subject matter described herein includes a system for non-intrusive mean opinion score estimation based on packet loss pattern. The system includes a first module for receiving a stream of packet data and determining a probability of packet loss for the received stream and a second module for non-intrusively determining an estimated mean opinion score for the received stream based on the determined probability of packet loss for that stream.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for non-intrusive mean opinion score estimation based on packet loss pattern.

Reference will now be made in detail to exemplary embodiments of the present invention, examples of which are illustrated in the accompanying drawings. Wherever possible, the same reference numbers will be used throughout the drawings to refer to the same or like parts.

Figure 1:
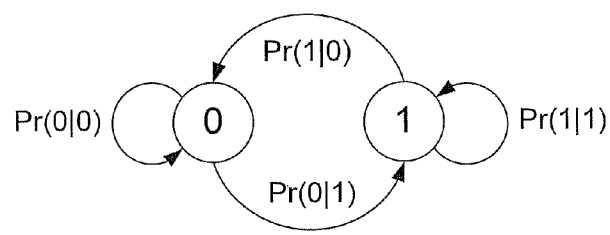
FIG. 1 illustrates a simple state machine for modeling packet loss.

FIG. 1 illustrates a 2-state Markov chain model also known as the Gilbert-Elliot model, which is a simple state machine for modeling packet loss. A lossy network can be modeled as having two states: state "0", which represents a "good" state, i.e., where the packet reaches its destination; and state "1", which represents a "bad" state, i.e., where the packet does not reach its destination, e.g., the packet is lost.

In this model there are defined four separate probabilities: $Pr(0|1)$ is the probability of going from a good state to a bad state, and can be thought of as the likelihood that the network will lose a packet. $Pr(0|0)$ is the probability of remaining in a good state, and can be thought of as the likelihood that the network will not lose a packet. $Pr(1|1)$ is the probability of remaining in a bad state, and can be thought of as the likelihood of the packet loss to happen in bursts. $Pr(1|0)$ is the probability of going from a bad state to a good state, and can be thought of as the likelihood that of the packet loss to not happen in bursts.

Mathematically, if the variable p is used to represent the value of probability $Pr(0|1)$, the value of $Pr(0|0)$ will be 1-p. Likewise, if the variable q is used to represent the value of probability $Pr(1|0)$, the value of $Pr(1|1)$ will be 1-q. The average packet loss rate r equals $p/(p+q)$. The probability q is related to the burstiness of the packet loss, with the probability of getting a burst of length n, equal to $q*(1-q)^{(n-1)}$.

Thus, the behavior of a lossy network may be characterized by observing how often on average a packet is dropped, from which the value p may be derived, and by observing how often a dropped packet is part of a sequence of consecutive packets that are also dropped, from which the value q may be derived. Likewise, burst packet loss can be modeled by choosing appropriate values for p and q. Both of these techniques are used in a system and method for non-intrusive mean opinion score estimation based on packet loss pattern, which will now be described. The systems and methods disclosed herein take advantage of an observed correlation between packet loss parameters calculated for a degraded packet data stream and the MOS score calculated for that degraded packet data stream. The MOS score is estimated using a polynomial function having packet loss parameters as variables and that models that observed correlation.

Figure 2:
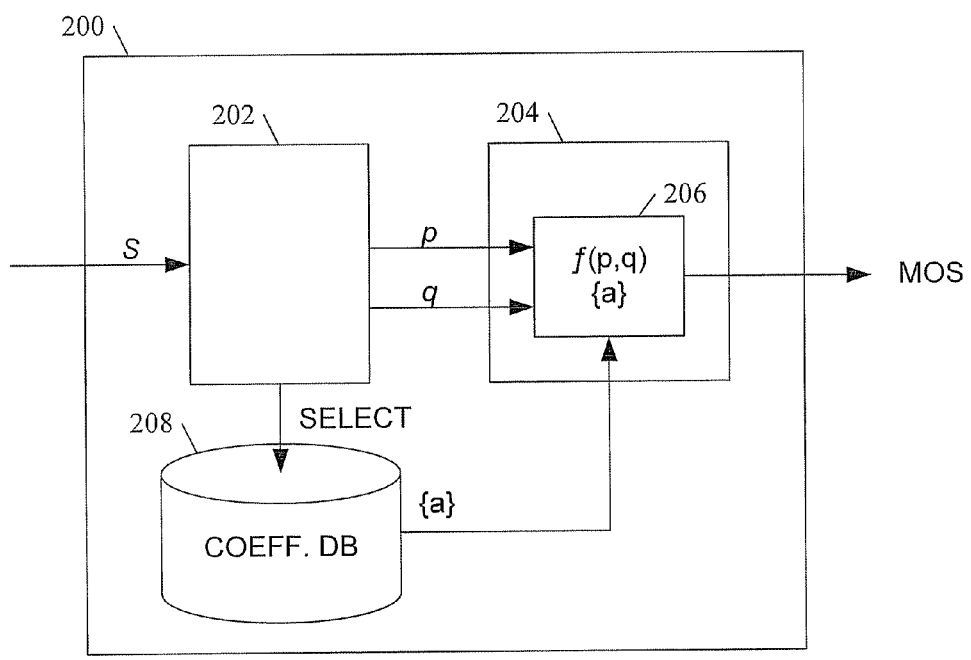
FIG. 2 is a block diagram illustrating an exemplary system for non-intrusive mean opinion score estimation based on packet loss pattern according to an embodiment of the subject matter described herein.

FIG. 2 is a block diagram illustrating an exemplary system for non-intrusive mean opinion score estimation based on packet loss pattern according to an embodiment of the subject matter described herein. System 200 includes a first module 202 that receives a packet data stream S and determines a probability of packet loss the received packet data stream, and a second module 204 that uses the determined probability of packet loss to generate an estimated MOS score, MOS. Examples of system 200 include network analyzers, network emulators, etc. Because system 200 calculates a MOS score based on packet loss probabilities and does not need to know the contents of the received packets, system 200 is non-intrusive. Thus, system 200 provides non-intrusive mean opinion score estimation based on packet loss patterns. The low complexity of this method allows good scalability, with the potential to perform thousands of quality of voice analyses concurrently.

In one embodiment, packets that belong to the same stream may be identified by looking at the routing or addressing information in the packet headers. Packets belonging to the same stream may be analyzed to determine packet loss probabilities for that particular stream. In this manner it is possible to characterize the behavior of the communications channel along which a particular data stream has traveled. In the embodiment illustrated in FIG. 2, for example, module 202 may calculate a probability of packet loss based on observation of packet header information, such as packet sequence numbers, which module 202 can use to detect the loss of a packet. By noting how often one or more packets are lost, module 202 can calculate packet loss probabilities, such as the probabilities p and q used in the Gilbert-Elliot model described above.

In one embodiment, module 204 may, use a mathematical function that maps packet loss probabilities to an estimated opinion score. In one embodiment, the mathematical function is a polynomial function having packet loss probabilities as parameters of or inputs into the function. In the embodiment illustrated in FIG. 2, for example, module 204 uses the values of p and g as inputs into a module 206 that implements a mathematical function, $f(p,q)$, that takes p and g as parameters in an equation that calculates an estimated MOS. An example mathematical function $f(p,q)$ is shown below:

$$f(p,q) = a_0 p^n + a_1 p^{n-1} q^1 + \ldots + a_{m-1} p^1 q^{n-1} + a_m q^n$$

Where $\{a_i\}$ are the coefficients of the polynomial. The coefficients should be selected such that output of mathematical function $f(p,q)$ is a good estimate of the MOS score that would be given to communications channel having packet loss probabilities p and q.

One advantage of implementing a polynomial such as described above is that by adjusting the coefficients, a generalized polynomial form can be adapted to accurately estimate the MOS score not only for different values of p and q, but also for different codecs, which may quite different responses to lost packets. For example, one codec may tolerate a high percentage of lost packets but may be less tolerant of lost packets that occur in long bursts. Another codec may tolerate long bursts of lost packets but may be susceptible to high numbers of randomly lost packets. Thus, in the embodiment illustrated in FIG. 2, module 202 may not only calculate packet loss probabilities, such as p and q, but may also detect the type of codec being used and pass that information to a coefficients database 208, which uses that information to select a set of coefficients {a} appropriate for the detected codec. The selected coefficients are then provided to module 206 for use in equation $f(p,q)$. In this manner, system 200 can dynamically adjust the characteristic equation $f(p,q)$ during run-time operation to give the correct MOS estimate for the particular codec used to encode packet data stream S. How an optimum set of coefficients for a particular codec are determined will now be described.

Figure 3:
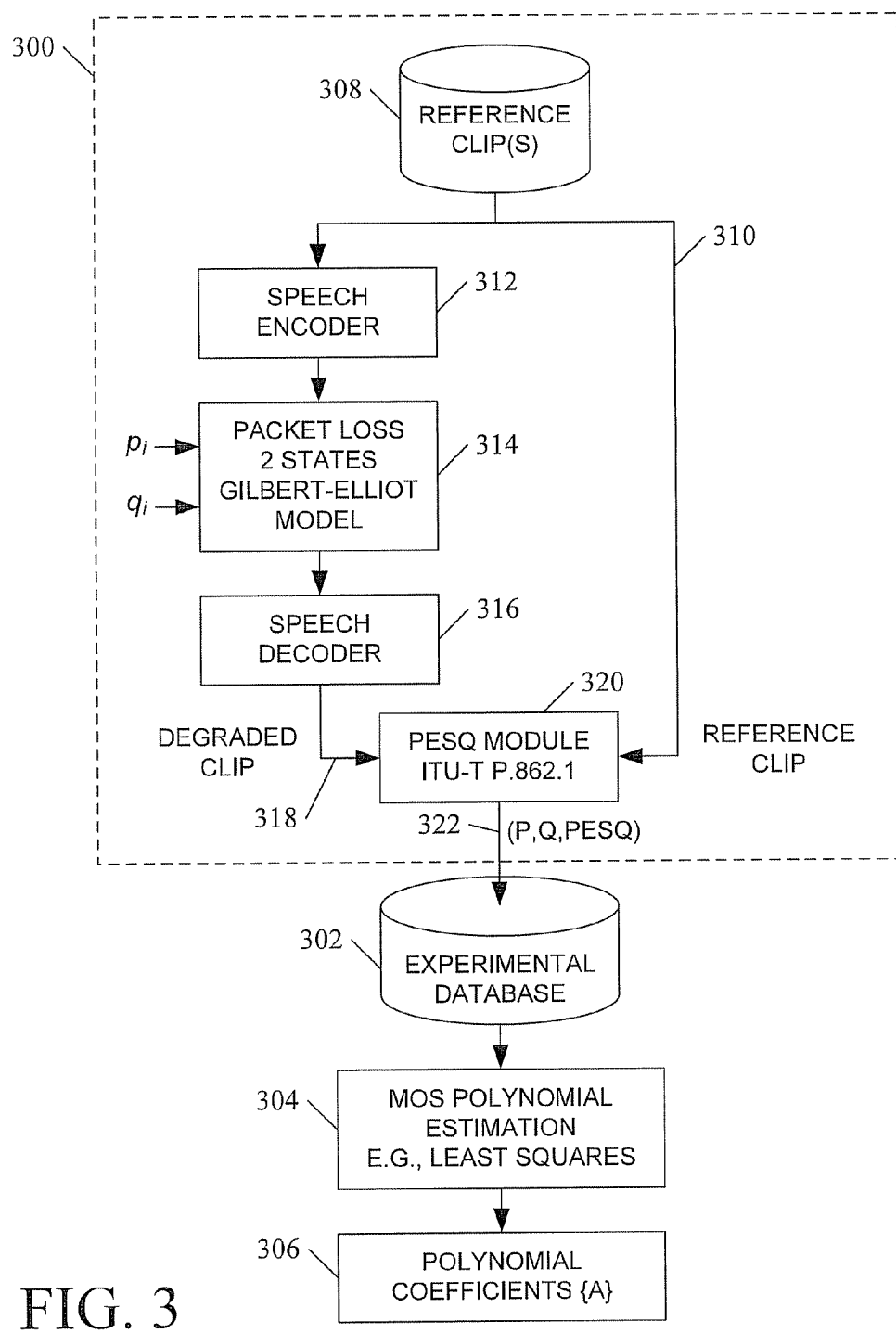
FIG. 3 is a block diagram of a system and method for determining coefficients for a polynomial function that estimates a MOS score for a communications channel having particular packet loss characteristics.

FIG. 3 is a block diagram of a system and method for determining optimum coefficients for a polynomial function such that the polynomial function accurately estimates the MOS score that would be given to a communications channel having particular packet loss characteristics and using a particular codec. The system illustrated in FIG. 3 performs a large number of iterations of a process 300 which degrades a reference clip or test tone according to a specified packet loss parameter, performs an intrusive opinion scoring algorithm to generate an opinion score for the degraded clip, and stores the association of the packet loss parameter and the resulting opinion score in an experimental database 302. The collected data is then subjected to a curve fitting algorithm 304, such as the least squares algorithm, which produces a set of coefficients 306 that optimally models the relationship of the packet loss parameter to the opinion score. This set of coefficients 306 may then be used by system 200 to give an estimate of MOS score based on the packet loss observed in incoming data stream S.

In the embodiment illustrated in FIG. 3, the curve fitting algorithm 304 may be a least squares algorithm, which is used to determine the set of coefficients $\{a_i\}$ 306 that produces an output that best fits the data contained in experimental database 302. For example, the opinion estimating module 204 illustrated in FIG. 2 uses a polynomial $f(p,q)$ to calculate an estimated MOS value. The Taylor series representation of $f(p,q)$ is:

$$f(p, q) = f(0, 0) + \left[ p \frac{\partial f(p, q)}{\partial p}(0, 0) + q \frac{\partial f(p, q)}{\partial q}(0, 0) \right] + \frac{1}{2!} \left[ p^2 \frac{\partial^2 f(p, q)}{\partial p^2}(0, 0) + pq \frac{\partial^2 f(p, q)}{\partial p \partial q}(0, 0) + q^2 \frac{\partial^2 f(p, q)}{\partial q^2}(0, 0) \right] + R(p, q)$$

Depending on the desired nth degree polynomial a number of terms from Taylor representation will be kept. For a nth degree polynomial of two variables there are m=(n+1)(n+2)/2 coefficients to be estimated, resulting the form of polynomial:

$$f(p,q) = a_0 p^n + a_1 p^{n-1} q^1 + \ldots + a_{m-1} p^1 q^{n-1} + a_m q^n$$

The least squares method implemented by curve fitting algorithm 304 solves over-determined systems by minimizing the squares of the errors:

$$S = \sum_{i=1}^{N} r_i^2$$

where $r_i = \text{PESQ}_i - f(p_i, q_i)$. For each entry in the database, $r_i$ is calculated using the "I" triplet $(p_i, q_i, \text{PESQ}_i)$. An overall square error S is calculated. The minimum for S is found for gradient equal to zero:

$$\frac{\partial S}{\partial a_j} = 2 \sum_{i=1}^{N} r_i \frac{\partial r_i}{\partial a_j} = 2 \sum_{i=1}^{N} r_i \frac{\partial f(p_i, q_i)}{\partial a_j} = 0, j = 1, \ldots, m$$

This leads to a system of m equations: A·a=B. The solution of the system yields the coefficients $\{a_i\}$ 306.

In one embodiment, the system illustrated in FIG. 3 operates independently of the system illustrated in FIG. 2. For example, a provider of network analysis equipment may perform the operations illustrated in FIG. 3 for a wide variety of codecs, and generate a different set of coefficients {a} for each codec tested, e.g., $\{a\}_{EVRC}$, $\{a\}_{AMR-WB}$, etc. The set or sets of coefficients may then be provided with, stored in, or otherwise incorporated into the network analysis equipment for use during operation of the equipment.

Process 300 will now be described in some detail. In the embodiment illustrated in FIG. 2, process 300 makes use of a source of reference clips, such as a reference clips database 308, which provides one or more reference clips 310. Each reference clip 310 may be, for example, a sample of male or female voices or other test tone having a complex waveform, such as simulated or machine-generated speech, or music. In one embodiment, reference clip 310 may be a voice clip in pulse code modulation (PCM) linear format or other suitable format. Reference clip 310 is encoded by a speech encoder 312, which outputs a stream of data packets, such as real-time transport protocol (RTP) packets, containing segments of the encoded reference clip.

These data packets are input into a module 314 for modeling packet loss according to packet loss parameters. In the embodiment illustrated in FIG. 3, module 314 implements a 2-state Gilbert-Elliot model, which takes as inputs packet loss parameters $p_i$ and $q_i$, and generates as an output a lossy data packet stream. In alternative embodiments, other packet loss models may be used, and other packet loss parameters may be used, but a system that intends to use the generated coefficients {a} must be designed to analyze an incoming data stream S to determine the same packet loss parameters that were used to generate the coefficients. For example, if module 314 models packet loss using packet loss parameters j, k, and l, as inputs to the packet loss model, then module 202 of FIG. 2 should provide parameters j, k, and l to module 204, and the polynomial function implemented in module 206 should use j, k, and l as inputs.

The lossy data packet stream is sent to speech decoder 316, which converts the data packet stream into a degraded clip 318. The format of degraded clip 318 is usually in the same format as reference clip 310, e.g., PCM linear format.

Degraded clip 318 is then given an opinion score. In one embodiment, reference clip 310 and degraded clip 318 are both used as inputs into an opinion scoring module 320 that calculates an opinion score for degraded clip 318. In the embodiment illustrated in FIG. 3, module 320 implements a PESQ algorithm and outputs a PESQ score for the degraded clip. In one embodiment, opinion scoring module 320 implements the standardized PESQ-LQ algorithm specified in ITU-T Recommendation P.862.1. The PESQ-LQ score (which is equivalent to a MOS value) so obtained is considered the reference MOS value. The reference MOS value is the target value for a given p, q pair; i.e., for a given value of p and q, the output of mathematical function $f(p,q)$ should be close to this reference MOS value.

In one embodiment, the output of opinion scoring module 320 is a tuple 322 that includes the packet loss parameter(s) and the resulting opinion score. In the embodiment illustrated in FIG. 3, for example, scoring module 320 produces a tuple 322 of the form (p, q, $PESQ_{pq}$). These tuples are stored in experimental database 302. The operations of process 300 illustrated in FIG. 3 are repeated many times for many different values of p and q. In one embodiment, for example, the values of p and q may be randomly or algorithmically generated. Likewise, one reference clip may be randomly or algorithmically selected from a number of reference clips contained in reference clip database 308, or the same reference clip may be used over and over.

In one embodiment, if there are multiple tuples generated with the same p and q values but with different PESQ values, each tuple may be saved independently. Alternatively, the various PESQ values generated for a particular p, q pair may be averaged together, and the mean value of PESQ is stored for the particular p, q pair.

It is noted that the since p and q are probabilities, the overall effect of a particular pair of p and q values may vary with each iteration, even if the same reference clip is used. One reason is that the effect of a dropped packet or packets on a listener's perceived evaluation of speech quality can vary significantly, depending oh whether the dropped packet occurred during an interval of speech or during an interval of silence. Loss of a portion of speech may significantly lower a PESQ score while loss of a portion of silence may have a minimal effect on a PESQ score. This is illustrated in FIG. 4.

Figure 4:
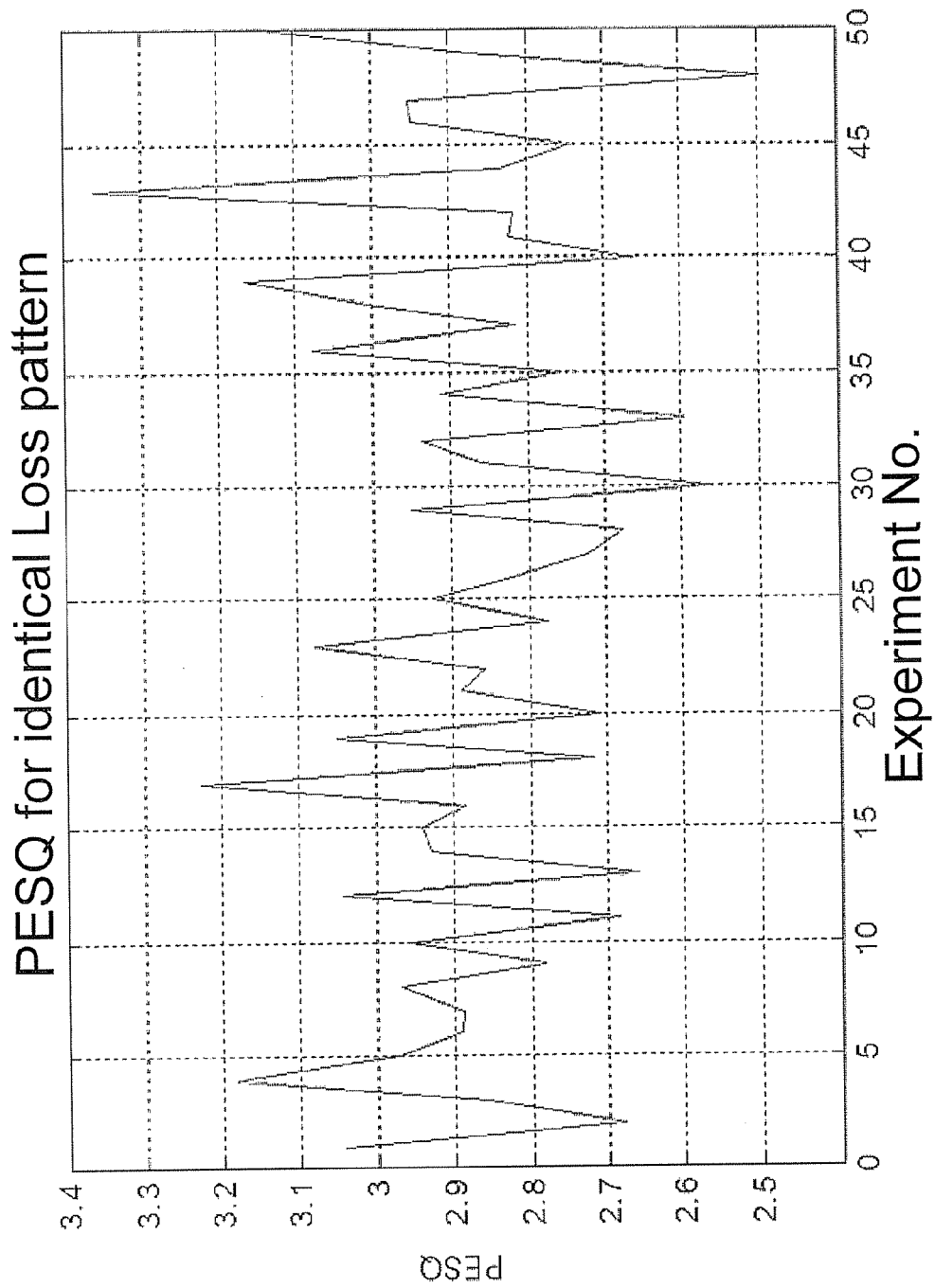
FIG. 4 is a graph showing the results of multiple runs of an intrusive algorithm for determining opinion scores, using the same reference clip and packet loss parameters for each run.

FIG. 4 is a graph showing the PESQ scores for fifty separate runs of system 300, using the same reference clip 304 and inputting into packet loss modeling module 314 the same values for $p_i$ and $q_i$ for each run. Because module 314 models packet loss as a probability, the location and number of lost packets was different for each of the fifty runs, which are listed in order from 1 to 50 on the X-axis. The PESO score for each run is shown on the Y-axis. It can be seen that the PESQ scores ranged from a high value of 3.35 (run 43) to a low value of 2.5 (run 48). It may be, for example, that in run 43 the packet loss occurred during periods of silence, in which case the reduction of perceived quality was relatively small, while in run 48, the packet loss occurred within periods of speech, in which the reduction of perceived quality was relatively large.

Figure 5:
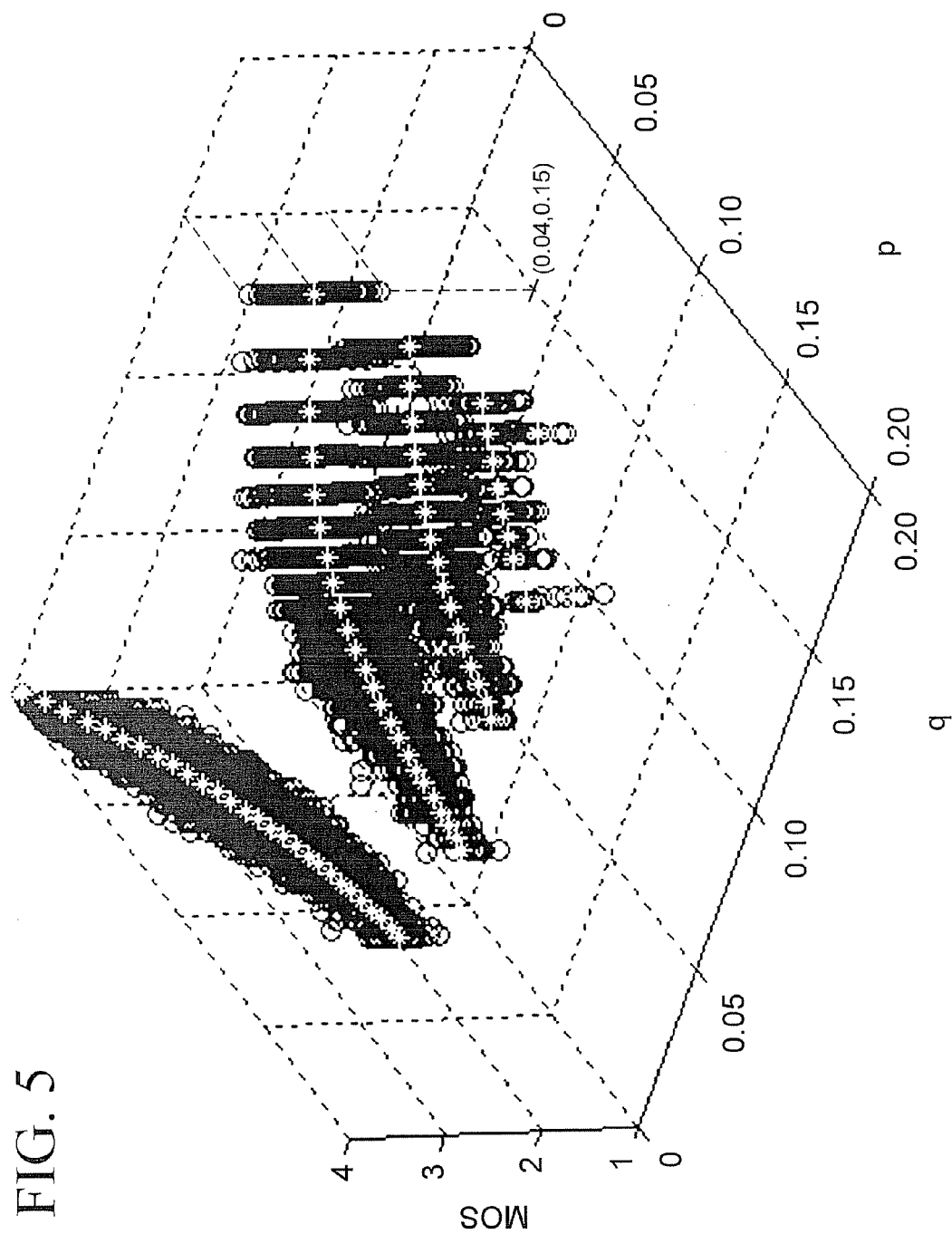
FIG. 5 is a graph showing the contents of a representative database containing multiple runs of an intrusive algorithm for determining opinion scores, using a range of packet loss parameters.

FIG. 5 is a graph in three dimensions showing the PESQ scores for a large number of runs of system 300. The bottom of the graph shows values of p and q along the X and Y axis, respectively, and the Z axis shows the PESQ scores. Each point on the graph is represented by a circle. The values for p and q range from 0.0 to 0.2, and the PESQ scores range from 1 through 4. For example, for p=0.04 and q=0.15, the PESQ scores range from 2.5 up to 4.0.

Referring again to FIG. 5, the white stars show the output of mathematical function $f(p,q)$ for which the least square method was used to calculate coefficients based on the data shown in FIG. 5 as black circles. It can be seen that with proper selection of coefficients {a}, the function $f(p,q)$ produces an estimated MOS value that is within the range of measured MOS values for observed data packet streams exhibiting loss characterized by p,q. In the example illustrated in FIG. 5, the output of $f(p,q)$ is a MOS value that appears to be the mean of the measured MOS values for each (p,q) pair.

Even for non-degraded data, the overall voice quality is dependent on the particular codec used for the data stream. Since all voice codecs are encoders with loss, the quality will vary based on the algorithm of coding, and the packet loss will have different effects on streams carrying different encoding payloads. Thus, one or more sets of polynomial coefficients may be collected for each codec used. Likewise, a set of polynomial coefficients may be collected for each of set of network conditions other than codec used.

The embodiment illustrated in FIG. 3 uses a mathematical function that maps packet loss parameters p and q to an opinion score, but alternate embodiments are contemplated. For example, packet loss parameters other than p and q may be used; a packet loss model other than the Gilbert-Elliot model may be used to create a degraded clip; an opinion algorithm other than PESQ may be used to score the degraded clip; a polynomial of an order or form different from the one described above may be used; a polynomial estimation method other than the least squares algorithm may be used, and so on.

In one embodiment, the data contained in experimental database 302 (and for which FIG. 5 is a representative graph of collected values) may be modeled not with one polynomial $f(p,q)$ but with multiple polynomials, e.g., in a piece-wise fashion.

In an alternative embodiment, a run-time database may be created that uses p and q as keys and which outputs a value that is equal to the average opinion score calculated during the data collection process shown in block 300. In this embodiment, module 202 may pass values p and q to module 204, which, instead of using a polynomial to calculate the MOS value to be output, performs a lookup into the run-time database to retrieve the MOS value associated with the particular p and q used as inputs. In this embodiment, the output of data collection process 300 is stored in database 304, where database 304 contains only one opinion score per p, q pair. This "one key, one value" database may be included in or otherwise made available to system 200, e.g., MOS estimation module 204 may receive p and q from module 202 and use the p, q pair (which are considered a single key) in a query that returns the MOS value for that key.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for non-intrusive mean opinion score estimation based on packet loss pattern, the method comprising:
   receiving a packet data stream;
   measuring the packet loss for the received data stream;
   calculating a probability of packet loss based on the measured packet loss; and
   calculating an estimated mean opinion score based on the calculated probability of packet loss using a function that maps probabilities of packet loss to measured mean opinion scores, wherein the function was derived by generating a plurality of probabilities of packet loss, and, for each generated probability of packet loss: generating, from a reference data stream, a degraded data stream suffering packet loss according to the generated probability, measuring a mean opinion score for the degraded data stream using an intrusive algorithm that operates on the contents of the data packets of the degraded data stream, and determining an association between the generated probability of packet loss and the calculated mean opinion score.

2. The method of claim 1 where the step of calculating an estimated mean opinion score is performed by a network analyzer or network emulator.

3. The method of claim 1 wherein calculating an estimated mean opinion score based on the calculated probability of packet loss comprises calculating an estimated mean opinion score by using a mathematical function that uses the calculated probability of packet loss as input and that outputs the estimated mean opinion score.

4. The method of claim 3 wherein the coefficients of the mathematical function are selected such that the estimated mean opinion score produced by the mathematical function for a given probability of packet loss approximates mean opinion scores measured for an observed lossy data packet stream exhibiting the given probability of packet loss.

5. The method of claim 4 wherein the measured mean opinion scores are part of a database containing data that maps the probabilities of packet loss to measured mean opinion scores.

6. The method of claim 5 wherein the coefficients of the mathematical function are selected by using the data in the database as input into a least squares method to determine the coefficients of the polynomial.

7. The method of claim 1 wherein measuring a mean opinion score for the degraded data stream comprises comparing the reference data stream to the degraded data stream.

8. The method of claim 7 wherein measuring a mean opinion score for the degraded data stream comprises applying a perceptual evaluation of speech quality (PESQ) algorithm to compare the reference and degraded data streams.

9. The method of claim 1 wherein measuring the packet loss includes detecting the absence of a packet by detection of a missing packet sequence number.

10. The method of claim 1 wherein calculating a probability of packet loss based on the measured packet loss comprises calculating a probability p that a packet will be lost and calculating a probability $(1-q)$ that a subsequent packet will also be lost.

11. The method of claim 1 wherein calculating an estimated mean opinion score based on the calculated probability of packet loss comprises querying a database for associating a probability of packet loss with an estimated mean opinion score, the query containing the calculated probability of packet loss, and receiving from the database an estimated mean opinion score.

12. A system for non-intrusive mean opinion score estimation based on packet loss pattern, the system comprising:
a first module for receiving a stream of packet data and determining a probability of packet loss for the received stream; and
a second module for determining an estimated mean opinion score for the received stream based on the determined probability of packet loss for that stream using a function that maps probabilities of packet loss to measured mean opinion scores, wherein the function was derived by generating a plurality of probabilities of packet loss, and, for each generated probability of packet loss: generating, from a reference data stream, a degraded data stream suffering packet loss according to the generated probability, measuring a mean opinion score for the degraded data stream using an intrusive algorithm that operates on the contents of the data packets of the degraded data stream, and determining an association between the generated probability of packet loss and the calculated mean opinion score.

13. The system of claim 12 wherein at least one of the first and second modules is a component of a network analyzer or network emulator.

14. The system of claim 12 wherein the second module determines the estimated mean opinion score by using a mathematical function that maps probability of packet loss to estimated mean opinion score.

15. The system of claim 14 wherein coefficients of the mathematical function are selected such that the estimated mean opinion score produced by the mathematical function for a given probability of packet loss approximates mean opinion scores measured for an observed lossy data packet stream exhibiting the given probability of packet loss.

16. The system of claim 15 comprising a database for maintaining the association between a probability of packet loss and the measured mean opinion score for a data packet stream exhibiting the given probability of packet loss.

17. The system of claim 16 wherein the coefficients of the mathematical function are selected by using the data in the database as input into a least squares method to determine the coefficients of the polynomial.

18. The system of claim 12 wherein the measured mean opinion score for the degraded data stream is determined by comparing the reference data stream to the degraded data stream.

19. The system of claim 18 wherein a perceptual evaluation of speech quality (PESQ) algorithm is used to compare the reference and degraded data streams.

20. The system of claim 12 wherein the second module determines an estimated mean opinion score for a received stream by querying a database for associating a probability of packet loss with an estimated mean opinion score, the query containing the calculated probability of packet loss, and receiving from the database an estimated mean opinion score.

21. A non-transitory computer readable medium having stored thereon executable instructions that when executed by the processor of a computer control the computer to perform steps comprising:
receiving a packet data stream;
measuring the packet loss for the received data stream;
calculating a probability of packet loss based on the measured packet loss; and
calculating an estimated mean opinion score based on the calculated probability of packet loss using a function that maps probabilities of packet loss to measured mean opinion scores, wherein the function was derived by generating a plurality of probabilities of packet loss, and, for each generated probability of packet loss: generating, from a reference data stream, a degraded data stream suffering packet loss according to the generated probability, measuring a mean opinion score for the degraded data stream using an intrusive algorithm that operates on the contents of the data packets of the degraded data stream, and determining an association between the generated probability of packet loss and the calculated mean opinion score.

* * * * *